(12) United States Patent
Mischo

(10) Patent No.: US 6,692,669 B2
(45) Date of Patent: Feb. 17, 2004

(54) METHODS AND APPARATUS FOR RECYCLING ASPHALT SHINGLE MATERIAL INTO COMPOSITE BOARD PRODUCTS

(75) Inventor: Donald J. Mischo, Janesville, WI (US)

(73) Assignee: American Builders & Contractors Supply Company, Inc., Beloit, WI (US)

( * ) Notice: Subject to any disclaimer, the term of this patent is extended or adjusted under 35 U.S.C. 154(b) by 78 days.

(21) Appl. No.: 09/837,920

(22) Filed: Apr. 18, 2001

(65) Prior Publication Data

US 2002/0008330 A1 Jan. 24, 2002

Related U.S. Application Data

(60) Provisional application No. 60/197,867, filed on Apr. 18, 2000.

(51) Int. Cl.[7] .......................... B29B 11/02; B29B 11/10; B29B 11/12; B29B 11/14; B29B 13/10
(52) U.S. Cl. .................. 264/115; 264/37.1; 264/118; 264/122; 264/123; 425/113; 425/200; 425/296; 425/308
(58) Field of Search .................. 264/37.1, 109–128; 425/113, 200, 296, 308

(56) References Cited

U.S. PATENT DOCUMENTS 4,587,070 A * 5/1986 Niwa et al. ............... 264/122

* cited by examiner

Primary Examiner—Stephen J. Lechert, Jr.
(74) Attorney, Agent, or Firm—Keith Frantz

(57) ABSTRACT

Used and manufacturing scrap asphalt shingle material is processed into a relatively coarse material comprising pieces or flakes of a maximum predetermined size. The flakes are finish processed into a composite board product in a method that includes (i) mixing the flakes with a relatively high percentage content of solvent suffused fiber,
(ii) grinding and heating the flakes and fiber to form a homogenous semi-liquid mixture,
(iii) extruding and conveying the homogenous mixture to a board forming station, and
(iv) compressing the mixture into the composite board product.

13 Claims, 5 Drawing Sheets

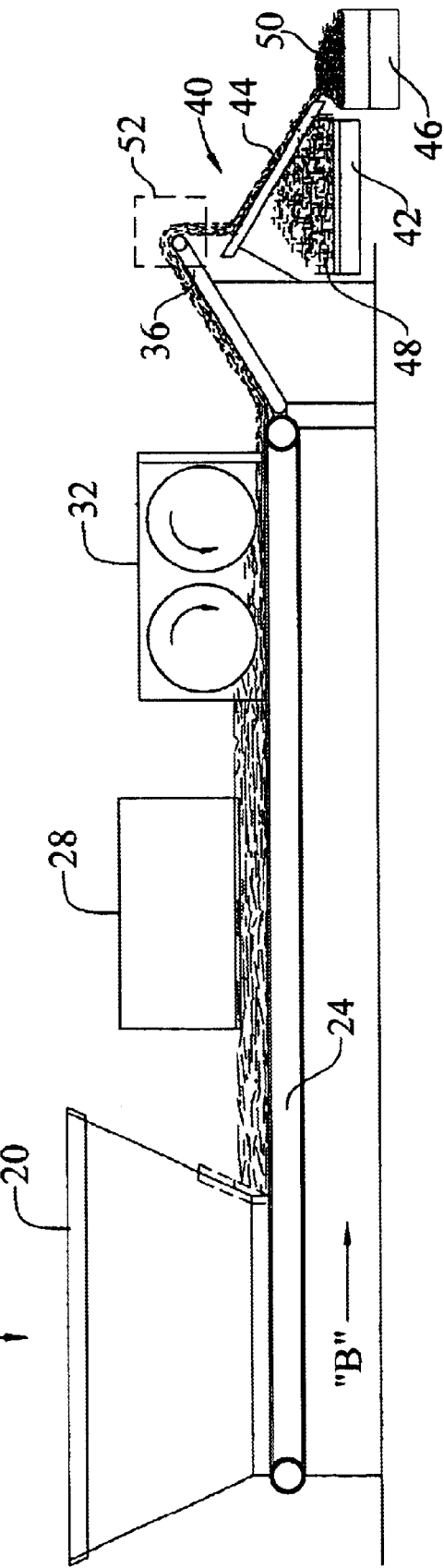
FIG. 1
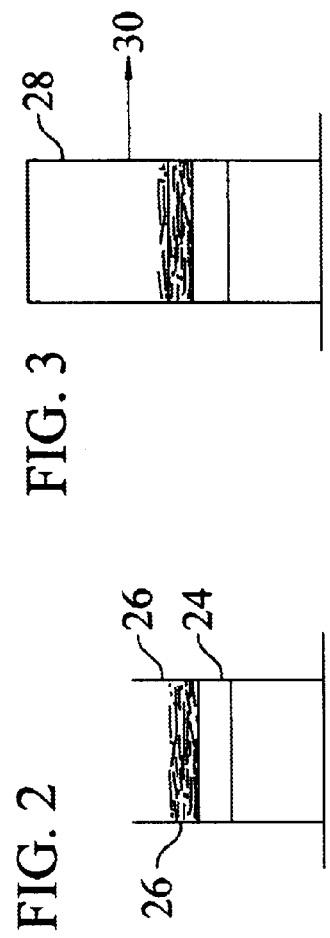
FIG. 2
FIG. 3

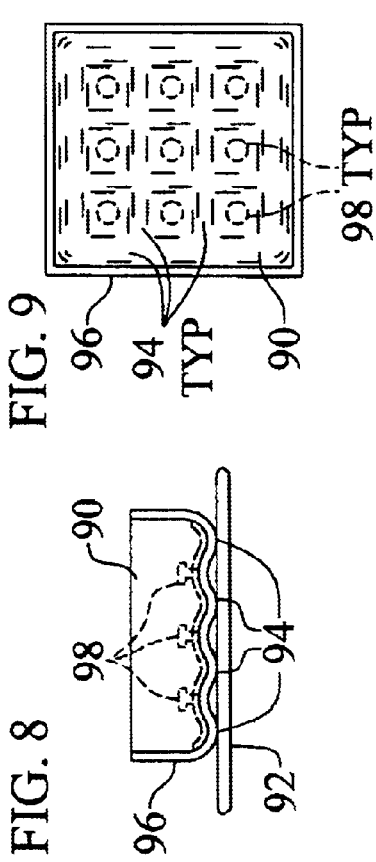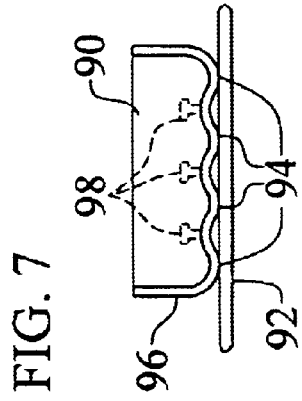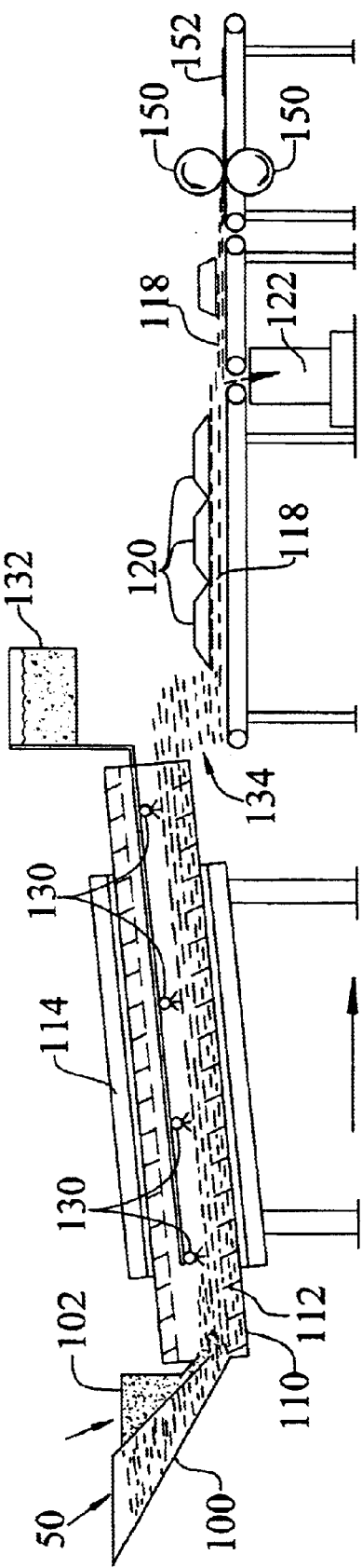
FIG. 7
FIG. 8
FIG. 9
FIG. 10

METHODS AND APPARATUS FOR RECYCLING ASPHALT SHINGLE MATERIAL INTO COMPOSITE BOARD PRODUCTS

CROSS-REFERENCES TO RELATED APPLICATIONS

This application claims priority to U.S. Provisional Patent Application Ser. No. 60/197,867, filed Apr. 18, 2000.

Reference to microfiche appendix (specifying the total number of microfiche and total number of frames) for computer programs:—None.

BACKGROUND OF THE INVENTION

1. Field of Invention

This invention relates generally to recycling processes, methods and associated apparatus.

More particularly, the invention relates to processes, methods and apparatus for recycling used and scrap asphalt shingles and shingle-like materials typically comprising an asphalt-saturated felt or fiberglass sheet or other fibrous material with a granular coating.

2. Description of Prior Art

A substantial quantity of used and scrap asphalt shingle material is generated each year from the replacement of shingle roofing, and from the manufacture of new shingles. This material generally consists of irregular to full-sized used or scrap "tear-off" shingles removed from roofs, and irregular trim edges, end scraps, cut-out tabs and other scrap and waste from new shingle production. Manufacture of conventional sized shingles typically results in three to six scrap cut-out tabs of approximately ¼ inch wide by 5 inches long per shingle. It has been estimated that this manufacturing scrap material alone will result in approximately 270,000 tons of waste during the year 2000. Substantially all of this used and scrap shingle material is disposed in land fills, with some portion being disposed through other techniques.

As is well-known, overuse and disposal of waste in landfills has created numerous problems, resulting in the need to transport waste to remote locations in certain areas of the country. Advantages of reducing the disposal of this waste material are well-known, and include conservation of resources, and reducing land fill use. These advantages have resulted in substantial efforts to reclaim and recycle as many materials as economically possible; such recycling efforts being publicly subsidized in certain instances. Therefore, it is desirable to develop new and improved methods and apparatus for recycling used and manufacturing scrap asphalt shingle materials into useful products.

Numerous prior methods for recycling shingle material are known. However, for a variety of reasons, these prior-methods have not been widely accepted. In general, prior methods for recycling asphalt shingle material have focused on only limited uses and/or are directed toward only a few specific types of products, resulting in associated limited markets being available for distribution of such products. None of the prior methods provide recycled products suitable for offering in the consumer market. Thus, there is a need for new and improved recycling methods that are suitable for producing a wide variety of products, including consumer related products, from used and manufacturing scrap asphalt shingle material; the manufacture and use of such additional products from recycled shingle material assisting in the reduction of disposal of such used and manufacturing waste material.

Basic molding of articles from asphalt shingle material is disclosed in, for example: Ford, U.S. Pat. No. 1,290,954 discloses chilling asphalt-saturated felt roofing waste product for ease of breaking and grinding the product into small particles, and then forming articles by placing the ground product into a mold under pressure and a small amount of heat. Robinson, U.S. Pat. No. 1,732,281 discloses a machine that shears and agitates asphalt roofing material; the process raising the temperature of the mixture such that the output is a "plastic mass . . . suitable for molding operations."

Much of the prior art related to or including recycling of asphalt shingle material is directed toward road building or road repair. For example: McGovern, U.S. Pat. No. 3,261,269 and Defregger et al. U.S. Pat. No. 3,615,804 disclose methods for preparation of a liquid or semi-liquid product suitable for use in road patching. Glynn, Jr. U.S. Pat. No. 5,344,485 discloses a method for recycling asphalt shingle material in the production of asphaltic concrete blocks. Pavelek, U.S. Pat. No. 5,511,899 discloses the use of loose asphalt shingle tear-off pieces to form a cushioning layer under a road. Richards, U.S. Pat. Nos. 5,221,702 and 5,367,007 disclose methods for the production of road paving blocks molded from a composite material of asphalt, polyethylene, mono-filament fiber, and elastomer; noting that the use of an elastomer for binding and a polymer for strength is a common prior approach for preparation of a product with a composite including recycled asphalt shingle material.

Several other factors have resulted in difficulties with recycling asphalt shingle material on a successful commercial basis. In addition to the limited products and uses for prior recycling art, these factors include: (1) Although there are a few locations of concentrated sources of supply at manufacturing sites, the bulk of the supply of used or scrap shingle material is literally scattered through out the country, as shingles are removed from roofs, with no particularly concentrations of available material except to the extent of concentrations of population; and (2) Persons or businesses are typically interested in recycling used and/or manufacturing scrap asphalt shingle materials because they have a ready supply of such materials available, and such supplies of shingle material are typically found in locations related specifically to the roofing industry. However, as mentioned above, prior methods for recycling shingle material typically utilize other recycled materials that may not be readily available in the same locations. For example, a steady supply of scrap shingle material may be available from a manufacturing plant, whereas a supply of recyclable elastomer would be available from used tires at a tire recycling center, and a supply of recyclable polyethylene may be available from a conventional recycling center. Unfortunately, the locations or such types of sources of recyclable materials may or may not be located within relative proximity of each other. Therefore, recycling shingle material with typical prior methods requires either transportation of these additional materials to the shingle recycling plant, or the use of new materials in the shingle recycling processes.

Thus, there is a need for new and improved methods for recycling asphalt shingle materials into a variety of useful products that do not require substantial supplies of additional raw or recyclable materials, eliminating or reducing the need to locate, purchase and transport such additional materials to the shingle recycling center; and thus further reducing the cost of products made from recycled shingle materials.

SUMMARY OF THE INVENTION

The general objective of the present invention is to provide new and improved methods, processes and apparatus for recycling of used and scrap asphalt shingle materials into a variety of useful products.

A detailed objective is to achieve the foregoing by providing for initial processing of the shingle material into (i) fine material having a relatively high aggregate-to-asphalt ratio and (ii) coarse/flake material, each being suitable for further processing according to certain product manufacturing finishing methods and apparatus.

A more detailed objective is to provide such initial processing methods suitable for (i) adjusting the aggregate-to-asphalt composition ratio of the fine material, and (ii) adjusting the maximum flake size of the coarse material.

Another detailed objective of the invention is to provide new methods and apparatus for producing a variety of usefully shaped, high-strength, high-density, durable products from the fine material flowing from initial processing of the shingle material.

A more detailed objective includes providing methods for decorative and/or functional surface treatments of at least exposed surfaces of the shaped products.

Yet another detailed objective of the present invention is to provide new methods and apparatus for producing a variety of useful landscaping and erosion control products from the flake material produced during initial processing of the shingle material.

Still another objective is to provide new and improved methods for producing a composite board product from the flake material.

These and other objectives and advantages of the invention will become more apparent from the following detailed description when taken in conjunction with the accompanying drawings.

BRIEF DESCRIPTION OF THE DRAWINGS

FIG. 1 is a diagrammatic view taken from the side of one embodiment of apparatus for initial processing of used and manufacturing scrap shingle material.

FIGS. 2 and 3 are front views of certain apparatus shown in FIG. 1.

FIGS. 7–9 are side, front and bottom views, respectively, of a certain product shaped and surface treated.

FIG. 10 is a side diagrammatic view of apparatus for processing of coarse flake material from the initial processing of the apparatus of FIG. 1 into ground cover and/or erosion control products.

Figure 4:
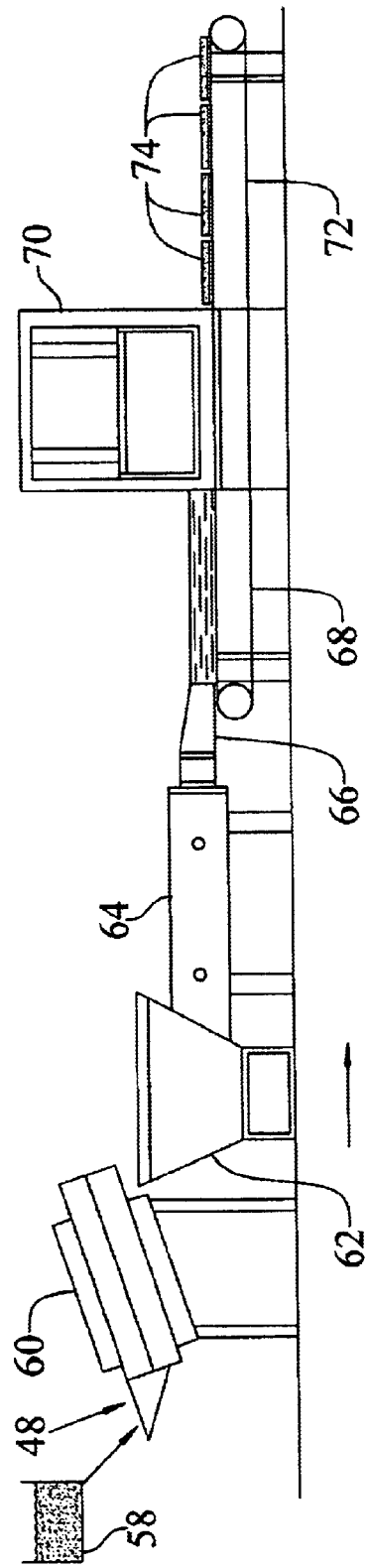
FIG. 4 is a side diagrammatic view of apparatus for processing of fine material from the initial processing of the apparatus of FIG. 1 into shaped products.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

I. Initial Material Processing

For purposes of illustration, one embodiment of methods and apparatus for initial processing of asphalt shingle material is shown in the drawings in FIG. 1. In this instance, used and scrap asphalt shingle material is initially processed into (a) coarse flake material and (b) fine material suitable for separate subsequent finish processing into finished products. The initial processing methods and apparatus of the invention are generally suitable for use with all types of asphalt shingle materials, such as (a) used or scrap tear-off shingles removed from roofs, including irregular to full-sized used shingles; and (b) manufacturing scrap including irregular trim edges, end scraps, and cut-out tabs resulting from conventional original shingle manufacturing.

Briefly, initial material processing of the asphalt shingle material is accomplished according to a method comprising the following steps:

1. Collect used and/or manufacturing scrap asphalt shingle material, and transport material to a recycling center.
2. Separate undesired objects from the collected material.
3. Chop or shred the material into flakes sized at a predetermined maximum of between approximately 1 to 4 inches.
4. Separate the shredded material into (i) fine material and (ii) coarse material, the fine material being pieces sized at a predetermined maximum of between approximately ½ to 1½ inches.
5. Forward the fine material and the coarse material to separate finishing process lines for production of finished products.

As discussed further below, initial processing parameters or characteristics such as (a) the preferred maximum flake size, (b) the preferred ratio of larger shredded flakes to fine material, and (c) the preferred aggregate-to-asphalt ratio of the fine material will, to a great extent, be based on the subsequent finish processing methods used in the production of finished products, and are typically a result of selected compromises therebetween.

Referring more particularly to the flow of asphalt shingle material through initial processing as illustrated in FIG. 1: As indicated by arrow "A", the shingle material is initially dumped or otherwise received into a receiving station such as hopper 20. The material exits the hopper through an outlet opening provided at one side for delivery onto a conveyer belt 24 and carrying through initial processing in the direction indicated by arrow "B" in FIG. 1. The conveyor belt 24 shown is of conventional construction, supported by longitudinally spaced, laterally extending rollers, and driven by an electric motor or other suitable drive means, and preferably includes or is associated with sides 26 (FIG. 2) for containment of the loose shingle material. The material is carried on the conveyor belt 24 through "picking apparatus" or cleaning station designated at 28. In preferred embodiments, the cleaning or picking apparatus includes equipment such as used at recycling plants for automated removal of metals, plastics, paper and other unwanted objects and materials, and ejects the unwanted materials as indicated at 30 (FIG. 3) for collection and disposition. Alternately, for example, the unwanted objects and materials are manually removed from the shingle material at station 28.

The "cleaned" material is then carried through a chopper or shredder station 32 that chops and/or shreds the material until it is reduced to a desired or predetermined maximum size. The maximum size of the shredded material will be selected, in part, based on the ratio of fine material to coarse material desired for delivery to finish processing. In general, selecting a larger maximum size shredded material generally results in less fine material available for finish processing, whereas reducing the maximum size of the shredded material typically results in an increased volume of fine material.

The ratio of fine material to coarse material is also affected by the method and apparatus (discussed further below) used for separating such materials. Adjustment of the maximum size of shredded material flowing from station 32 will cooperate with the separating of these materials to achieve the desired ratio.

The desired maximum size of the shredded material will also depend, in part, on the specific processing method(s) selected for finish processing of the coarse flake material. For example, in finish processing of the flake material into a composition board (discussed below), larger flakes are generally preferred for the longer fibers therein.

In general, it has been found that shredding the shingle material to a maximum size of between approximately 1 to 4 inches typically results in a mix of fine material and coarse flakes of suitable properties and quantity for finish processing according to at least those methods discussed below, subject to the factors related to certain embodiments mentioned above and discussed further below.

In certain preferred embodiments, the shingle material is shredded to a maximum size of between approximately 2 to 3 inches. This approximate size, while not necessarily optimized for any one specific finish processing method, provides material in reasonable quantities and suitable for all of the finish processes described below.

It will be understood, however, from the forgoing and in view of the additional discussion below, that the actual desired maximum size of the shredded material is a compromise of several factors, and is based, in part, on subjective issues and preferences of the operator. In other words, in certain instances, it will be desirable for the shingle material to be processed into substantially greater quantities of fine material, such as when increased production of finished products from fine material is desired, or when the size and/or nature of the used/scrap material precludes production of reasonable quantities of coarse material. Similarly, it will be desirable in certain instances for the shingle material to be processed into substantially greater quantities of coarse material. Accordingly, the preferred shredder 32 includes provision for adjusting the maximum size of flakes being discharged therefrom.

As an example, one type of shredder that has been successfully used on a small scale is a MaxiGuard #460 model manufactured by CMI Rexworks. In this instance, the shredder includes replaceable screens, each screen having different sized openings, for controlling the maximum size of shredded pieces flowing out of the shredder.

Continuing with initial processing, the shredded material is then removed from the conveyor line for separating or filtering of the shredded material into (a) the fine material and (b) the coarse flakes by a screening-filtering apparatus 40. In one embodiment, the shredded material simply falls from the end of a horizontal conveyor line such as belt 24 to a screening-filtering apparatus. Alternately, as in the embodiment shown, the material flows from the end of conveyor belt 24 onto a second conveyor belt 36 to carry the material upwardly, the conveyor belt 36 having an open downstream end, with the filtering apparatus 40 being located below the free end of this second conveyor belt.

The shredded material may be optionally removed from the conveyor belt with the assistance of mechanical apparatus, or electro-mechanical apparatus generally indicated at 52 such as having magnetic pulley head and eddy current capability.

In carrying out this aspect, the filtering apparatus 40 includes a first bin 42 covered with a vibrating screen element 44 that is inclined at an adjustable angle, and that is controlled by an oscillating electric motor or other suitable vibratory drive apparatus. A second bin 46 is located below the downstream end of the screen 44. The screen 44 includes openings such that the loose fiber and smaller sized shredded material falls through the screen into the first bin 42 to comprise the fine material 48, and the larger pieces of shredded material slide down the screen into the second bin 46 to comprise coarse flake material 50. With this filtering arrangement, the loose sand and other small aggregate from the used/scrap shingle material will fall through the screen 44 with the finely shredded shingle material.

In preferred embodiments, the filtering apparatus 40 includes provision for adjusting the size of the openings in the screen 44, to control the maximum size of the separated material content. To that end, for example, either (a) the screen is removably associated with the first bin 42 such that screens having different sized openings can be installed as desired, or (b) the screen is of a commercially available type that includes provision for adjusting the size of the openings. In preferred embodiments, the angle of the screen 44 is also adjustable. This permits adjustment of the speed of the shredded material as it slides along the filter, thus providing further adjustment capability to achieve the desired fine and coarse material properties and ratios. To this end, the size of the openings in the screen 44 are adjusted to achieve either (a) a desired aggregate-to-asphalt ratio in the fine material in bin 42, or (b) desired minimum size pieces in the coarse material in bin 46. It is noted that decreasing size of the openings in the filtering screen results in higher aggregate-to-asphalt ratio in the fine material 48, and a smaller minimum sized flakes in the coarse material; whereas increasing the size of the openings results in reduced aggregate-to-asphalt ratio and larger minimum sized flakes.

The desired aggregate-to-asphalt ratio of the fine material 48 will depend on the finishing process utilized for manufacture of finished products, and certain desired physical characteristics of such finished products. In the finishing processes described below, it is generally desirable to have a relatively high-aggregate-to-asphalt ratio in the fine material. This may be achieved by either (a) adjusting the size of the openings in and angle of the screen 44 to control the aggregate-to-asphalt ratio of the fine mix in the bin 42, or (b) adding aggregate to the mix in a subsequent step. Alternately, for example, when utilizing certain prior methods for finish processing of fine material, such as processes in which polymers, elastomers and other materials are added to the mix, a lower aggregate-to-asphalt ratio in the fine material 48 will be suitable. In general, it has been found that filtering the fine material to a maximum size of between approximately ½ inch to 1 inch results in a relatively high aggregate-to-asphalt ratio in the fine mixture suitable for finish processing according certain methods discussed below.

Following the screening or filtering process, the fine material 48, and the coarse flake material 50 are preferably forwarded to different finish processes, for production into different types of finished products.

Although collection of fine material 48 and coarse material 50 is shown in FIG. 1 in connection with collection bins, it will be understood that alternate embodiments will provide automatic transport provisions such as additional conveyor belts for carrying the material to the appropriate final processing lines on a continuous flow basis. Further, it will be understood that implementation of initial processing of the asphalt shingle material, as well as the finishing processes discussed further below, will typically be controlled by a control system comprising a controller and associated control components. A preferred control system includes provision for controlling the flow rate of the asphalt shingle material delivered to the shredder 32. Such control may be accomplished in any suitable manner such as either: (1) The hopper includes a gate 20A and associated electromechanical actuator, such as including an electric motor, that is operatively connected and responsive to a signal from the process controller for controlling the size of the outlet opening in the hopper; and/or (2) The conveyor belt speed drive includes variable speed controls that are operatively associated and responsive to a control signal from the controller. Those skilled in the art will appreciate that a preferred control system may also include other operatively connected open or closed-loop control elements suitable for the apparatus utilized during initial processing of the asphalt shingle material, such as for monitoring the flow of material through the shredder 32, the accumulation of separated material in the bins 42 and 46, and the ratio and characteristics of the fine and coarse material.

Advantageously, with the foregoing methods and apparatus, all types of asphalt shingle materials, including irregular to full-sized used or scrap tear-off shingles removed from roofs, and manufacturing scrap including irregular trim edges, end scraps, and cut-out tabs resulting from conventional original shingle manufacturing, are reclaimed and prepared for finish processing into multiple finished products.

II. Processing of Fine Material

Fine material 48 resulting from initial processing of used and/or manufacturing scrap asphalt shingle material, or provided from other sources, is formed into high-density asphalt-aggregate finish-shaped products such as bricks, pavers, architectural and landscape erosion control products, roof top pavers, parking bumpers, retaining wall blocks and faux stones. As will be evident, the fine material may be formed into numerous other shaped products with the methods hereof Briefly, processing of the fine material 48 into a desired shaped product includes the steps of: 1. Grinding the fine material to a consistency, and heating the material to a temperature, suitable for molding, or suitable for extruding and cutting, into the desired shaped product; and 2. Forming the shaped product by either placing the ground, heated mixture into a mold and applying pressure to the material in the mold, or extruding the material and die-cutting the shaped product. Processing of the fine material into the desired finish-shaped product will optionally include application of a surface treatment.

Figure 6:
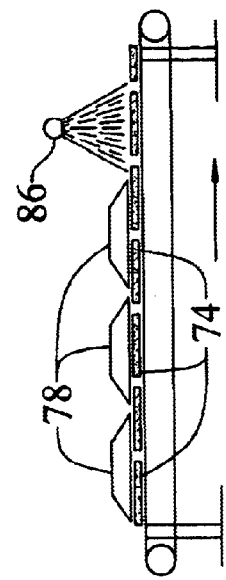
FIGS. 5 and 6 are side diagrammatic views of apparatus for alternate embodiment surface treatment processing of shaped products.
Figure 5:
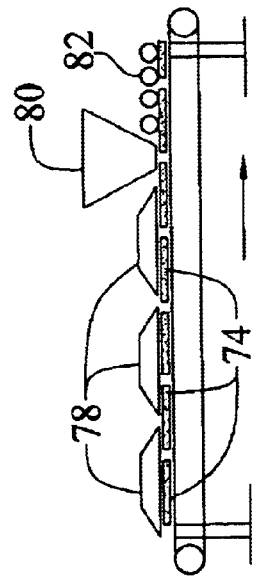

For purposes of illustration, certain alternate embodiments for processing of the fine material 48 into shaped product is shown in the drawings in FIGS. 4–6. It is noted that the fine material 48 includes shredded pieces of shingle material smaller than the openings in the filtering screen 44, as well as aggregate comprising granules and sand that was adhered to the shingle material during manufacture, some of which will have become loosened or dislodged from the larger pieces of shingle material during shredding, and the fiber content of the smaller pieces of shingle material.

In general, a relatively high aggregate content is desired to achieve a finished product with suitable high-density, high-hardness and good self-adhesion properties. Less aggregate results in a softer, less dense, less durable product. In preferred embodiments, the aggregate content, i.e., the preferred aggregate-to-asphalt ratio, of approximately 50–50 (i.e., between approximately 30% to 70% aggregate content, by weight) results in finished bricks, pavers and the like with suitable self-adhesion, strength, hardness and durability properties for their intended uses.

To achieve the desired aggregate-to-asphalt ratio, either (a) the shredding and separating steps of the initial processing are controlled to achieve the desired aggregate-to-asphalt ratio for processing into the finished product, or (b) the initial processing is run without specific concern to the aggregate-to-asphalt ratio in the fine material, and then sand or fine granules is added to the mix as necessary to achieve the desired ratio. In the first instance, initial processing of the used/scrap asphalt shingle material will include the step of controlling the aggregate-to-asphalt ratio in the fine material 48; comprising the sub-steps of monitoring the aggregate-to-asphalt ratio in the fine mixture 48, and adjusting the openings and angle of the filtering screen to adjust the maximum size of pieces exiting the shredder 32. In the latter case, processing of the fine material 48 will include the steps of checking the aggregate-to-asphalt ratio of the mixture, and adding aggregate to the mixture to achieve the desired ratio.

A. Forming the Shaped Product

Referring more particularly to the embodiment shown in FIG. 4: The fine material 48 obtained from the bin 42, and optionally sand or other fine aggregate 58, together comprising the fine material mixture having the desired aggregate-to-asphalt ratio, is fed into and carried through a preheater 60 whereupon the material drops into an inlet hopper 62 of a grinder/mixer 64. The preheated material flows from the hopper 62 through the grinder/mixer 64 where the fine material is ground to a desired consistency, thoroughly mixed, and further heated to a temperature of approximately 250±50 degrees F. The precise desired consistency and temperature of the fine material mixture will be determined as suitable for subsequent processing methods, and the size, shape and intended use of the end product. The temperature of the material exiting the preheater 60 is controlled to cooperate with the grinder/mixer 64 such that the material exiting the mixer is at a desired temperature.

One suitable type of commercially available grinder/mixer 64 that is specially suitable for use with asphalt products is a machine known as a sigma mixer. The conventional sigma mixer is a double, counter-rotating arm, sigma blade type mixer, with a heated jacket and auger discharge. This mixer is capable to receive material from the inlet hopper, grind the material to a desired or predetermined consistency, and raise the temperature of the ground material to approximately 250±50 degrees F when suitably preheated. The sigma mixer is a batch-type machine, able to receive, grind and hold the material until it reaches the desired consistency and/or temperature. The heated, ground material is then discharged with a discharge auger that is operatively disengaged (running in reverse) during the mixing, grinding and heating process.

It is possible, depending of coarse on the specific grinder model utilized, to raise the temperature of the ground/mixed product in the mixer to a suitable temperature for further processing. However, it has been found that the time needed to grind the fine mixture 48 to the desired consistency is typically less than the time needed for the sigma mixer to heat the mixture to the desired temperature. Advantageously, utilizing the preheater 60 prior to the mixer reduces the time needed for the mixer to raise the material to the desired temperature, and thus promotes increased material flow through the mixer.

It will be understood that, although a batch-type mixer is shown and described, use of a mixer suitable for producing a continuous supply of ground, heated asphalt-aggregate mixture falls within the scope of the present invention.

In the embodiment shown, an extruder 66 with an exchangeable head is located at the discharge end of the mixer 64 to supply material for further processing into desired shaped product. With the auger discharge of the sigma mixer, the extruder assists in controlling the direction of flow of the ground, heated mixture as it exits the mixer, and assists in controlling density of the mixture as it flows therethrough to provide a relatively uniform density. The extruder also assists in forming the mixture flow into a size desirable for finish processing. In this instance, the mixture is extruded to either exact sizes for subsequent die cutting, or is extruded oversize to compensate for subsequent compression in forming the finished product and/or shrinkage of the finished product. The material exiting the extruder head 66 is then conveyed to the next processing station for defining the shape of the finished product.

The shape forming machine 70 is operative to receive and process the extruded material into the desired shaped product by either:—die cutting the extruded material into the desired shaped product; or—(i) loading the material into a mold, (ii) applying pressure, i.e., compressing, the material in the mold to the desired density and size for formation of the desired shaped product, and (iii) removing the shaped product from the mold.

In the case of molding, preferred molds are of relatively simple construction, with the top open for receiving a pressure actuated ram, or pressure-application unit, therein. In this instance, the operative end of the ram is either sized for a relatively close fit with the sides of the mold, or sized with sufficient clearance for a predetermined quantity of asphalt to squeeze out under the applied pressure. Precise mold construction and dimensional clearances are established based on specific aggregate-to-asphalt ratios, temperatures and pressures, mold construction, part shrinkage and other physical parameters affecting the molding process. Those skilled in the molding arts will appreciate that numerous mold configurations and pressure application apparatus and processes will be successfully utilized for the forming of shaped products from the heated aggregate-asphalt mixture.

Off-take conveyer belt 72 carries the die cut or molded shaped products 74 from the shape forming machine 70 for cooling and packaging, or for further processing as discussed below.

In certain instances, it will be desirable to treat one or more surfaces of the shaped articles for durability, or for decorative and/or wear resistance purposes. In such instances, the surface treatment is preferably embedded into the treated surface in order to enhance the durability and life of the treatment.

B. Surface Treatments—Materials

Due to the normal black or dark coloring of an aggregate-asphalt based product, it is desirable in numerous embodiments to color at least exposed surfaces of the finished products. One such surface treatment colorant that has been found particularly suitable for use in connection with several processing methods hereof is iron oxide particles such as is commonly available in red and green colors. Alternately, for example, colored surface treatments such as granite dust (from the sawing of granite stones) is equally suitable for use in connection the asphalt-aggregate shaped products.

In connection with certain asphalt-aggregate products, it will be desirable to apply a surface treatment that is both decorative and wear resistant to exposed product surfaces. One such surface treatment material that is suitable for use in connection with certain processing methods hereof is relatively small, decorative stones or pebbles. Such treatments are particularly advantageous when applied to one side of bricks to be used for walk-ways.

Yet another surface treatment that has been found to be suitable for use, particularly in a molding process, are the scrap cut-out tabs from the original manufacture of conventional shingles. In this instance, the cut-out tabs are not processed through chopping and separating as discussed above, but are withheld for surface treatment purposes. As noted above, such cut-out tabs are typically about ¼ inch wide by 5 inches long, and are covered on one side with decorative, wear resistant aggregate. As a result, the tabs themselves may serve as both a decorative and wear-resistant surface treatment. Provided the tabs are used on a suitably sized product surface, the tabs can be used substantially as received from the shingle manufacturing process, without further processing; or they can be chopped, cut or otherwise reduced in length as necessary to accommodate surface treatment of products with smaller sized surfaces.

Those skilled in the art will appreciate that surface treatment materials other than those specified above are and will be suitable for use according to the present invention. In general, such surface treatments will be compatible with the asphalt-aggregate mixture, and with the intended end use environment.

C. Surface Treatments—Methods

Two basic alternate approaches to effect surface treatments in aggregate-asphalt formed product with the above-identified surface treatment materials include:

Methods comprising use of surface treatment material during the molding process; and Methods comprising application of surface treatment material to the shaped product, with such methods thus being suitable for use with both molded and die cut products.

1. Molding of Product With Decorative and/or Wear Resistant Surface Treatment Materials In an alternate molding process, a layer of colorant such as colored iron oxide is placed on a lower surface in the mold prior to loading the mold with the heated aggregate-asphalt mixture. In this instance, compressing the material in the mold results in the colorant becoming embedded in the associated surface of the molded product, producing an article with a decorative surface treatment on a surface intended to be exposed during use.

In a preferred embodiment, a colored asphalt-aggregate pre-mix is used as the colorant surface treatment for the shaped product. In this instance, iron oxide colorant is premixed into a asphalt-aggregate mixture until the mixture is colored as desired. A layer of the colored mixture, such as between approximately ¼ to ⅜ inch thick, is placed into the bottom of the mold prior to loading the mold with the heated mixture from the sigma mixer 64. Compression of the entire mixture in the mold results in fusing of the pre-mix with the uncolored mixture into the shaped product. In this instance, the pre-mix is preferably heated to approximately the same temperature, and is of approximately the same composition or aggregate-to-asphalt ratio of the uncolored mixture. Advantageously, using a colored pre-mix reduces the cost of using relatively expensive iron oxide for coloring purposes.

Alternately, for example, a layer of small stones or pebbles is placed into the mold prior to the asphalt mixture for embedding a decorative and wear resistant coating into the associated surface of the molded article during compression of the mixture.

In yet another alternate embodiment, the scrap cut-out tabs from original manufacture of shingles are molded into the shaped product to provide both decorative and wear resistant surface treatment. In this instance, a layer of tabs such as between approximately ⅛n inch to ½ inch thick is placed into the bottom of the mold prior to loading the mold with the heated asphalt-aggregate mixture from the sigma mixer 64. The tabs are preferably arranged in an overlapping manner to cover the entire bottom surface of the mold, with the granular coated side of the tabs facing the bottom of the mold. Compression of the heated asphalt-aggregate mixture in the mold results in fusing of the mixture and tabs to produce a mosaic-like textured surface treatment. If desired, loose, decorative, wear resistant aggregate may also be placed into the bottom of the mold with the cut-out tabs to assist in insuring complete coverage of the surface to be treated.

Of course, numerous other suitable variations and combination of the above surface treatments are contemplated herein such as (a) utilizing a thin layer of tabs with a colored asphalt-aggregate premix in the bottom of a mold, or (b) chopping the waste cut-out tabs into smaller pieces prior to placing into the bottom of the mold with or without additional loose aggregate and colored premix.

2. Application of Decorative and/or Wear Resistant Surface Treatment Material to Shaped Product Briefly, application of surface treatment material to a shaped product comprises the steps of: 1. Softening the surface to be treated—by raising the temperature of the surface to be treated to a minimum of approximately 275 degrees F.; and then 2. Embedding the surface treatment material into the softened surface by utilizing pressure impregnation techniques.

Two alternate methods for application of surface treatments to shaped products, and suitable for use with both molded and die cut products, are illustrated in the drawings.

In the embodiment shown in FIG. 5, shaped product 74 is carried on conveyor belt under IR or other surface heaters 78 located downstream of the shape forming machine 70 for softening of the exposed surfaces facing the heaters. The shaped product then pass under the screened outlet of hopper 80 for sprinkling or application of the surface treatment material (i.e., surface texture, coloring, etc.) onto the softened surface. Finally, the shaped product pass under compression rollers 82 to firmly embed the surface treatment material into the softened surface.

In an alternate embodiment shown in FIG. 6, after passing under the heaters 78, the shaped product 74 are carried past a spray nozzle 86 that sprays the surface treatment material under high pressure, utilizing sand-blasting techniques, to embed the material into and coat the softened surface. In this instance, both the compressed air and the surface treatment material are heated to a temperature of approximately 275 degrees F so that cooling of the surface does not inhibit penetration of the surface material.

In alternate embodiments: (a) one or more surfaces of the shaped product are softened with ovens, or other heating elements or surface heaters prior to application and embedding of the surface treatment material; or (b) the processing of FIG. 5 or 6 are either repeated or otherwise modified for treatment of multiple surfaces of the shaped product. In yet another alternate embodiment, the shaped product cut from the extruded asphalt-aggregate mixture, while still heated, is simply rolled in a surface treatment material such as granite dust.

It is noted that:

1. Although certain processes hereof are illustrated in different views for purposes of illustration and discussion, it will be understood that certain of such processes may be combined and included on one uninterrupted processing line without departing from the scope and spirit of the invention hereof;
2. It is assumed herein that molding methods utilize a mold that is open to the top, and that the aggregate-asphalt material comprising the molded product is compressed with a ram or other suitable apparatus that approaches from above the mold and compresses downwardly in the mold; whereas it will be apparent that other orientations can be provided for within the scope and spirit of the present invention.
3. Except to the extent necessary to understand the present invention, topics such as but not limited to die design, shrinkage, mold design and part removal have not been specifically addressed herein as these are well-known factors and considerations in molding and extruding design and practice.
4. Any material drop-off or waste during or resulting from any processing hereof will be preferably reclaimed and recycled back through the next processing cycle.

It is also understood that the illustration and identification of certain components in the processes shown and described herein are presented in a general sense, and illustration and identification herein are intended to comprise and include all functionally equivalent or suitable substitutes. For example only, although "conveyor belts" are illustrated and identified herein, it is understood that other means may be utilized for moving material, mixture and product within the scope of the present invention.

D. Alternate Molding Process—Molding of Articles With Thin Plastic Casing Surface Treatment Material.

A shaped aggregate-asphalt product 90 such as is suitable for use as a roofing paver is shown in FIGS. 7–9. In this instance, the paver 90 is suitable to set on top of a roof such as provided with a flexible liner or membrane 92, the bottom of the paver being formed with parallel and perpendicular ridges 94 in a criss-cross manner, or otherwise formed with spaced "feet" to provide for multi-directionally drainage of water under the pavers. Unfortunately, the asphalt content of an aggregate-asphalt shaped product can be detrimental to some conventional roofing membranes, such as those made from EPDM, after long-term exposure.

In accordance with an alternate molding process of the present invention, a 5-sided plastic, profiled liner 96 is placed in a mold at the molding station prior to loading the mold with heated aggregate-asphalt mixture. The liner then encases the bottom and sides of the finished paver and is optionally provided with locking studs 98 embedded in the paver to secure the liner in place. With this arrangement, the paver liner 96 isolates the paver 90 from the roof liner 92, and thus protects the roof liner from potential detrimental effects of long-term exposure to the asphalt content of the pavers.

In yet another alternate embodiment (not shown), the shaped product is molded with a plastic liner on one side only. In this instance, the liner is either inserted into the mold prior to loading the aggregate-asphalt mixture, or is placed onto the top of the mixture prior to compression thereof. Advantageously, plastic liners of these general types also act as a mold release membrane to assist in ease of removal of the paver from the mold. Accordingly, in other alternate embodiments (not shown), formation of certain molded products from heated aggregate-asphalt mixture as generally described above will include the use of disposable plastic liners that may be subsequently removed and discarded.

In yet other embodiments, the plastic liner is vacuum formed in the mold prior to loading the heated asphalt mixture. In this instance, the mold is used as a vacuum forming mold, as well as for accepting and molding the asphalt-aggregate mixture, thus eliminating the need to pre-form the plastic liner, and eliminating the need to provide a separate vacuum forming mold. It will be apparent to those skilled in the art that shaped aggregate-asphalt products may also be coated with a sealer for isolating the asphaltic content of such products. Advantageously, shaped products made according to the present invention are extremely resistant to degradation from wear and rotting, and are easily treated for desired decorative and/or functional purposes.

III. Processing of Coarse Material Into Ground Cover and/or Erosion Control Products Coarse flake material 50 from initial processing of the used and/or manufacturing scrap asphalt shingle material, or from other sources, is further processed via alternate embodiments into unique ground cover and/or erosion control products such as in the form of either loose ground cover, or a ground-covering/erosion control mat. In preferred embodiments, the processing of such products includes surface treatment with either a decorative material, a decorative and wear resistant material such as a decorative aggregate, and/or a functional material such as slow release insecticide.

Figure 11:
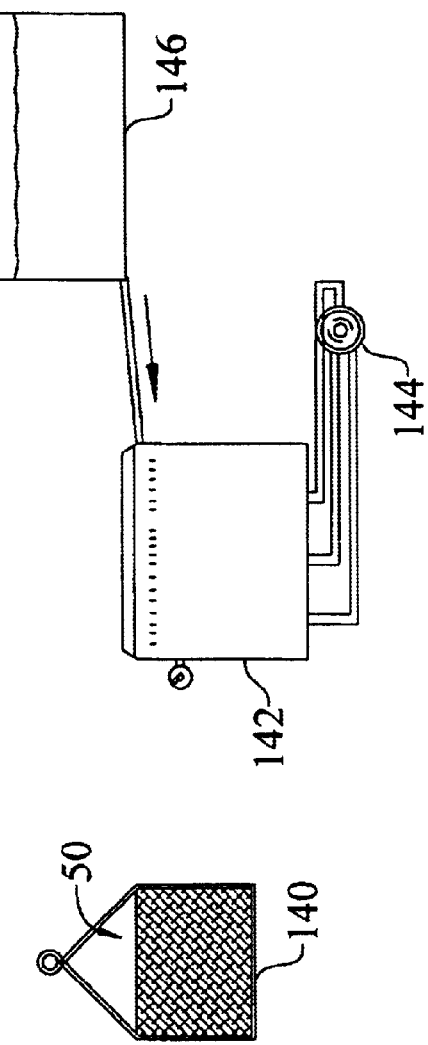
FIG. 11 is a diagrammatic view of an alternate embodiment for coloring flake material.
Figure 12:
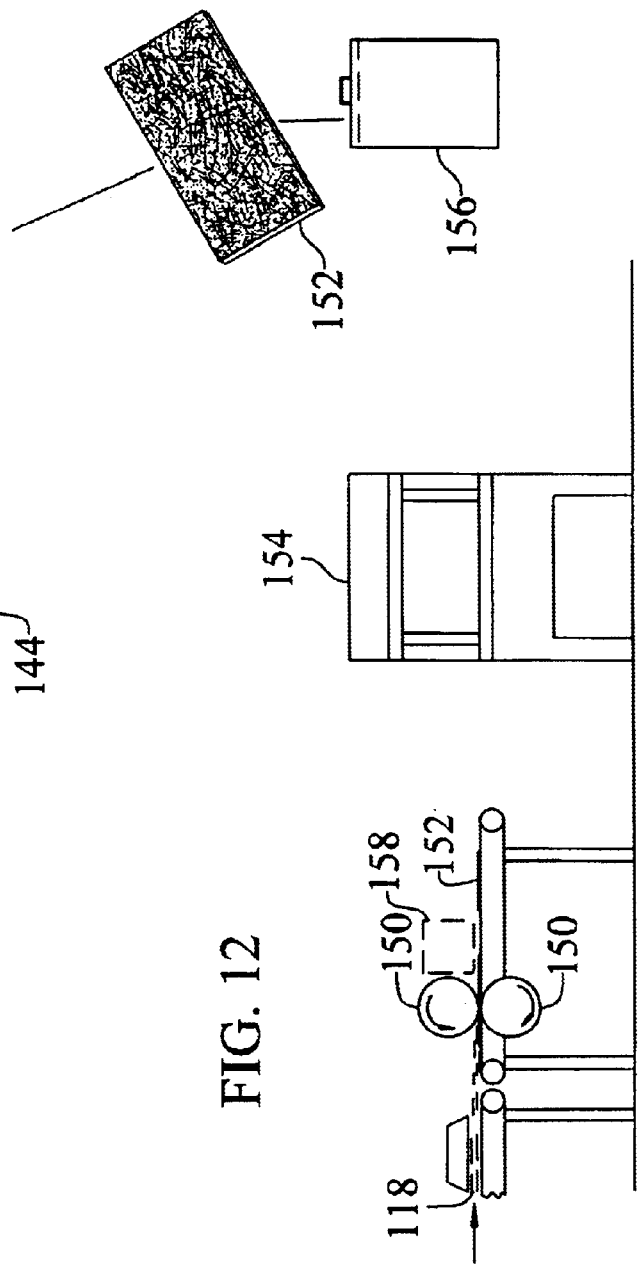
FIG. 12 is a side diagrammatic view of the downstream end portion of the apparatus of FIG. 10 and showing certain additional alternate embodiment apparatus suitable for use in additional processing of coarse flake material into ground cover and/or erosion control products.

For purposes of illustration, certain embodiments of methods and apparatus for the processing of coarse flake asphalt shingle material into ground cover and/or erosion control products are shown in the drawings in FIGS. 10–12.

Briefly, processing of the flake material 50 into ground cover/erosion control products comprises the steps of:

1. Tumbling the coarse material and a dry power or small aggregate material through a heater to pre-heat the flakes to a temperature of approximately 275±50 degrees F.;
2. Embedding a decorative, wear resistant and/or functional surface treatment material into the surface of the heated flakes; and either:
3. Drying and packaging the surface treated flakes for use as loose ground cover; or
4. Compressing the flakes into a ground cover/erosion control mat.

It is noted that the flake material 50 is the coarse shredded pieces of material that are larger than the openings in the separating screen 44 created during the initial processing of the asphalt shingle material. Preferably, substantially all of the granules have been removed from the flake material by the shredder 32 during the initial processing. This results in flake material which is most suitable for processing into ground cover products.

A. Preferred Methods for Producing Loose Ground Cover

Referring more particularly to the embodiment shown in FIG. 10: The flakes are initially processed in a mixing chamber such as the cylindrical mixing tube 110. In this instance, the mixing tube is provided with two inlet hoppers 100 and 102, radially inwardly extending internal auger flighting 112 on the inside diameter thereof, power means (not shown) for rotation of the auger, and a heating element 114 in the form of a cylindrical jacket. The flakes 50 from bin 46 are placed into the inlet hopper 100, and a powder or fine granular material is placed into the second inlet hopper 102. The flake and granular material are fed from the hoppers into the inlet end of the cylindrical mixing tube 110 at a desired volumetric flow rate, and tumble and mix in the mixing tube as the auger rotates and draws the mixture therethrough. The heating element 114 raises the temperature of the flakes to approximately 275±50 degrees F., and softens the surfaces of the flake material, as the flakes and granular material travel through the mixing tube. As a result, the sharp edges and protrusions that may be present in the shredded flake material 50 are rounded or blunted as they tumble in the mixing tube. Advantageously, the presence of the dry granular material keeps the flakes from clumping and sticking together as they soften and travel through the heated mixing tube.

In preferred embodiments, a screening apparatus 134, similar to the screening apparatus 40, is positioned below the outlet to the mixing tube 110 such that the small, loose granular product discharged from the mixing tube is separated from the treated flakes for recycling back into inlet 102 of the mixing tube. After discharge from the mixing tube, the treated flakes are carried through in-line dryers 120 to accelerate drying and eliminate clumping of the flakes during storage; whereupon the treated flakes are packaged in bags 122 for transport and use as loose ground.

B. Surface Treatment of Flake Material

In preferred embodiments, the granular material provided in hopper 102 comprises a surface treatment for the flake material. Typical surface treatment materials include powered or fine particles of colorant iron oxide, decorative sand or granite dust or other small aggregate. Alternately, for example, the surface treatment material is a slow, time-release granular insecticide. With the surface treatment materials provided in hopper 102, the surface treatment material becomes embedded into the softened surfaces of the flake material as the heated mixture tumbles through the mixing tube.

In an alternate embodiment, the mixing tube 110 is provided internally with a series of longitudinally spaced spray heads 130 connected to a supply tank 132 that carries a colorant water borne mixture for spraying and embedding into the surface of the heated, or non-heated, flakes.

In yet another embodiment, the supply tank 132 carries solvenated colorant for spraying into the tumbling flakes. In this instance, the solvent in the mixture assists to soften the surface of the flakes, reducing the need to heat the flakes in the mixing tube.

C. Alternate Surface Treatment of Flakes in Solution

In an alternate surface treatment process shown in FIG. 11, the screened flakes 50 are loaded into a mesh container 140. The mesh container and flakes are then placed into vat 142 containing a solution of water, dispersant, surfactant and iron oxide or other powdered colorant, and raised to a temperature of approximately 212 degrees F. A closed loop pumping system 144 re-circulates the solution in the vat to maintain the powder mix in suspension. As the flakes are exposed to the high temperature solution, the surfaces of the flakes soften and the colorant becomes embedded into the surfaces. Upon completion of surface treating, the mesh container is removed from the vat and the flakes are rinsed in container 146 with cool water. As the flakes cool, the surface treatment granules become locked into the surfaces of the flakes. The surface treated flakes are then dried and packaged for use as loose ground cover, or forwarded for further processing. Wash-down from the rinsing step is returned for use in the coloring vat.

In alternate processing, to reduce the time the flakes must be in the vat, the vat is closed and pressurized, with the temperature of the solution raised to approximately 275±50 degrees F.

D. Methods for Making Landscaping/Erosion Control Mat

In alternate methods, the coarse flake material 50 is compressed into a mat product for landscaping and/or erosion control purposes. The mats are formed in suitable sizes for ease of handling and placement. Briefly, the mats are produced by either compressing treated flakes between pressure rollers; or compressing flakes in a flat mold. The mats are optionally produced with an organic or inorganic scrim or backer fabric.

Referring more particularly to the process shown in FIG. 10 and continued in FIG. 12, layered treated flakes 118 are carried through pressure rollers 150 to compress the flakes on a continuous basis into a flexible semi-porous mat product. In this instance, the flakes are preferably in a semi-softened state as discharged from the mixing tube 110 during compression of the flakes into the mat product. The continuous mat product is then cut into mat sheets 152 to desired sizes at the finishing station generally designated as 158, and packaged for shipment. The mats are formed to a suitable thickness, such as between approximately ¼ to ½ inch thickness for relative ease of handling. Advantageously, use of the surface treated flakes 118 in the mat forming process obviates the need for further coloring or finish processing of the mats.

In an alternate embodiment, the treated flake material 118 is conveyed to a mat-molding machine 154 for loading into a mold 156 and compression into a flexible mat 152 of approximately ¼ to ½ half inch thickness.

In still another alternate embodiment, mats are produced from untreated flakes 50, and the surface of the mat is then treated with a decorative colorant or wear resistant coating utilizing surface heating and pressure impregnation techniques such as discussed above and illustrated in FIGS. 5 and 6. In this instance, the surface of the flakes are preferably softened prior to compression into the mat product at a spray station with an asphalt solvent.

In yet other alternate embodiments, the mats are produced with a mesh scrim or backing material. For example, in one embodiment, the backing is fed between the rollers 150 either on top of or below the layer of treated flakes. Alternately, the scrim is sandwiched between two mat portions, with the composite mat portions being farther compressed to secure or fuse the scrim and mat portions into one flexible mat product.

Advantageously, such ground cover/erosion control products are extremely resistant to degradation from wear and rotting, and are easily treated for desired decorative and/or functional purposes.

IV. Processing of Flake Material Into Composite Boards

Coarse material 50 from initial processing of the asphalt shingle material, or from other sources, is processed into a relatively rigid composite board product that is extremely resistant to degradation and rotting, and is suitable for numerous uses such as RFG recovery board, below grade water protection, expansion strips or concrete course pour separators, and roof walk pads.

Figure 13:
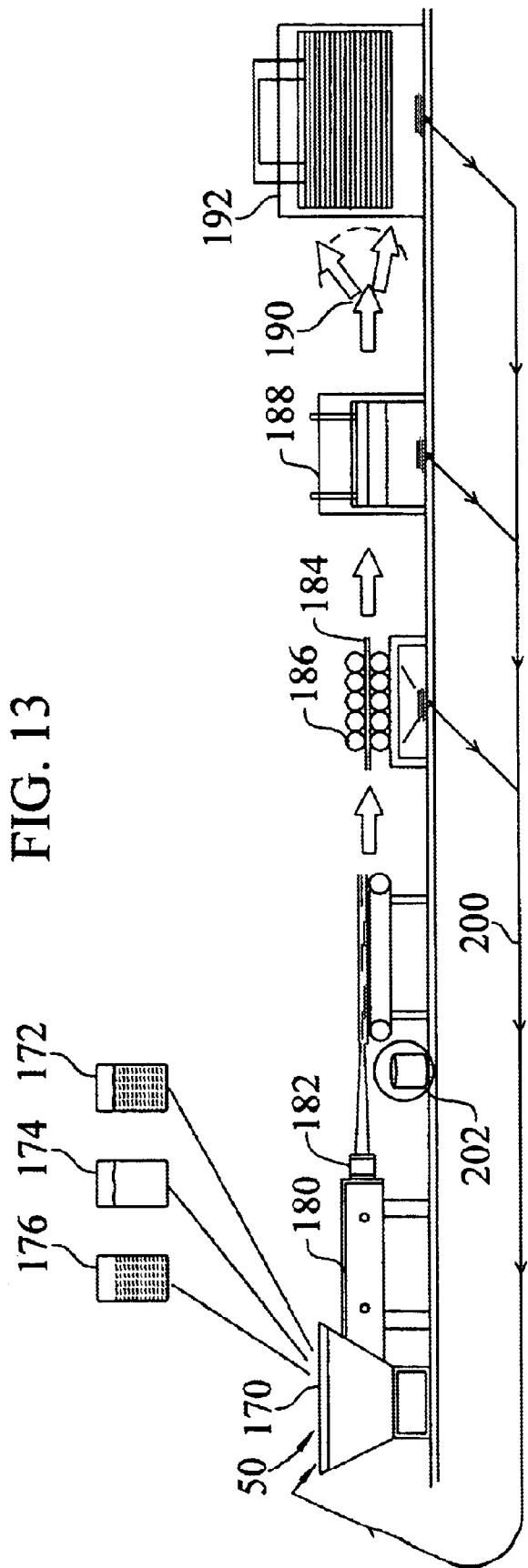
FIG. 13 is a side diagrammatic view of apparatus suitable for use in processing of coarse flake material into composite board products.

For purposes of illustration, one embodiment of methods and apparatus for the processing of coarse flake asphalt shingle material into a composite board product is shown in the drawings in FIG. 13.

Briefly, manufacture of the composite board product includes the steps of:
1. Mixing a relatively high content of fiber with the asphalt flake material;
2. Grinding and heating the fiber and flake together to form a homogenous semi-liquid mixture; and
3. Compressing the mixture into the board product.

A wide range of fiber types can be used to produce a composite board. Suitable fiber sources include, but are not limited to, organic fibers such as wood fiber or bagasse (sugar cane) fiber, and inorganic fibers such as acrylic, rayon, nylon and other synthetics typically used in the carpeting or fabric industries. Material compatibility and suitability for intended end use environment is also a consideration in the selection of the fiber. Varying amounts and types of fiber will yield composite boards suitable for a variety of applications.

In general, a relatively high fiber content is desired to produce a composite board of suitable high density and strength. The specific range of desired fiber content will depend on factors including: (i) desired board characteristics such as bending strength, shearing strength, and durability, and (ii) the length and diameter of the fibers in the composite board. In addition, relatively long fibers are preferred for use in fabrication of the composite board product. It has been found that longer fibers result in increased board strength, and contribute to the self-adhesion properties of the board, i.e., the board's ability to maintain its formed shape. Further, larger diameter fibers contribute substantially to the strength of the board as compared with thinner fibers. As a result, wood fibers will impart greater strength characteristics to a composite board than thinner acrylic fibers.

For example, when using commercially available wood fiber of approximately 1 to 1½ inches in length, such as is commercially available from under the trade name Great Lakes Aspen it has been found that a fiber content of between approximately 25% to 50% by volume, when used with flake material initially processed to a maximum size of between approximately 2 to 3 inches, and compressed with a pressure of between approximately 500 psi (pounds per square inch) and 1000 psi, produces a composite board having relatively high strength and density. In this instance, the specifications for the fiber used are: Fiber Size of 85% retained on a 20 mesh sieve, 10%±3% moisture content, 5.4±0.1 pH, 99.3%±0.3% organic matter, 0.7%±0.2% ash content, and 191% absorbtivity.

In an alternate embodiment, the percentage of wood fiber is reduced to between 15% to 25%, with an additional 15% to 25% acrylic fiber. In this instance, the wood fibers impart sufficient strength in the resulting composite board, while the longer acrylic fibers contribute to maintaining the board structure. However, it is understood that alternate specific composition percentages will be determined suitable.

When considering initial processing of the used and manufacturing scrap asphalt shingle material, while the maximum flake size of between approximate 2 to 3 inches is suitable, it is noted that initial processing established to produce flakes of a larger size, such as between approximately 2½ inches to 4 inches, resulting in contribution of longer fibers in the larger flakes to the board fabrication process, will be preferred in certain instances.

Referring more particularly to the embodiment shown in FIG. 13: The flakes 50 are initially mixed with asphalt solvent 174 and fiber 176 in a process staging area such as in the inlet 170 to the sigma mixer 180. The solvent softens the asphalt content in the ground chips, and allows for loading of relatively high fiber content into the mixture. Suitable asphalt solvents include mineral spirits and paint thinner; those skilled in the relevant arts will recognize that other known asphalt solvent compounds may be used in practicing the invention.

Advantageously, it has been found that premixing the solvent and fiber prior to mixing with the asphalt flakes permits the loading of an even higher percentage of fiber. Accordingly, in an alternate preferred embodiment, the flakes 50 are mixed with solvent suffused fiber 172 in the inlet to the sigma mixer. The chip-fiber-solvent mixture is then drawn into the sigma mixer where the mixture is finely ground, thoroughly mixed, and heated to a temperature of approximately 250±50 degrees F. When the mixture has reached the desired temperature and consistency, in relatively viscous state suitable to convey for further processing, the mixture is discharged through an extruder 182 located at the mixer discharge. The extruded mixture is then conveyed to a preliminary forming station comprising opposing sets of rollers 186, whereupon the mixture passes between the rollers and is compressed into a semi-finished continuous board product 184. The semi-finished continuous board product is then conveyed to a cutting machine 188 for cutting of individual boards.

In an alternate embodiment, the machine 188 is a combination panel press and cutting machine. In this instance, the extruded material is conveyed from the mixer 180 to the panel press 188 for compression and forming of the semi-finished board product, and cutting of the individual boards.

In a preferred embodiment, the individual boards are then conveyed and sorted by tippler feed method at 190, and further compressed with a multiple panel type platen press 192. Compression of the boards in the finishing press results in boards having a relatively constant thickness of relatively close tolerance.

As indicated with arrows 200, all drop off material may be reclaimed and recycled back to the mixture in the inlet of the sigma mixer.

It is noted that, in the embodiment shown, composite boards are fabricated in a batch-type process. However, it will be understood that, in an alternate embodiment, provision of a grinder/mixer capable of producing a continuous output (in place of the sigma mixer) will enable fabrication of the composite board product on a continuous flow basis.

Advantageously, the ground, heated mixture exiting the sigma mixer is also suitable for use as either a roof patching material, or a road patching material. The relatively long fibers in the mixture exiting the extruder assist in making the mixture generally suitable for such patching uses. In the manufacture of roof patching material, the mixture exiting the extruder is packed into cans or other suitable containers at 202. In the preparation of road patching material, aggregate is added to the flakes and fiber to provide additional density to the mixture. In this instance, the aggregate is either added to the sigma mixer shown, or the mixture extruded therefrom is conveyed to a second mixer for the addition and mixing of the aggregate, the extruded aggregate mixture is packaged in suitable containers.

I claim:

1. A method for fabrication of a composite board from asphalt flake material, the method comprising the steps of:
   mixing asphalt flake material and a relatively high content of solvent suffused structural fiber;
   grinding and heating the mixed asphalt flake material and solvent suffused fiber to a conveyable consistency; and
   compressing the mixture into a board.

2. A method for fabrication of a composite board from asphalt flake material, the method comprising the steps of:
   providing
      asphalt flake material,
      solvent suffused structural fiber,
      a substantially closed grinder having an inlet and an outlet,
      an extruder head connected to the outlet of said grinder, and
      opposing rollers downstream of the extruder head;
   feeding said asphalt flake material and a relatively high content of solvent suffused structural fiber into the inlet of the grinder;
   grinding the asphalt flake material and solvent suffused fiber together to obtain a mixture (i) in which the flake material has been ground relatively fine and (ii) that is of a conveyable consistency;
   discharging the mixture through the extruder head and conveying the mixture therefrom to the rollers;
   compressing the extruded mixture into a sheet with the opposing rollers;
   cutting the compressed sheet into semi-finished panels of desired size;
   stacking the semi-finished panels; and
   finish compressing the stacked panels.

3. The method of claim 2 in which the volumetric ratio of the structural fiber is between approximately 25% and 50% of the total volume of the mixture.

4. Apparatus for recycling asphalt shingle flake material into a composite board comprising:
   a material staging station having an inlet to receive the asphalt shingle flake material and having an outlet;
   a processing station receiving the flake material from the outlet of the material staging station and operative to mix and grind the flake material with asphalt solvent suffused structural fiber;
   an extruder receiving the mixed and ground material from the processing station and operative to produce extruded ground material therefrom;
   one of a pair of opposing compression rollers and a press for compressing the extruded material; and
   a cutter positioned to cut the compressed material into composite boards.

5. A method for fabrication of a composite board from asphalt shingle material comprising:
   forming asphalt flake material of a maximum predetermined size from the asphalt shingle material;
   mixing, grinding and heating the asphalt flake material with asphalt solvent and structural fiber to a conveyable consistency;
   conveying the mixture to a compressing station; and
   compressing the mixture into a board product.

6. The method as defined in claim 5 in which the asphalt flake material is formed to a predetermined maximum size of between approximately 2 to 4 inches.

7. The method as defined in claim 5 in which the mixing, grinding and heating of the asphalt flake material, the asphalt solvent and the structural fiber are performed simultaneously.

8. The method as defined in claim 5 further comprising extruding the mixture prior to conveying the mixture to the compressing station.

9. The method as defined in claim 5 in which the structural fiber comprises between approximately 25 to 50 percent of the combined volume of the asphalt flake material, the asphalt solvent and the structural fiber.

10. The method as defined in claim 5 in which the structural fiber is at least between approximately 1 to 1½ inches long.

11. The method as defined in claim 5 in which a press is provided at the compressing station for compressing the mixture into the board product.

12. The method as defined in claim 5 in which a pair of opposing rollers are provided at the at the compressing station for compressing the mixture into the board product.

13. The method as defined in claim 12 further comprising cutting the board product into cut boards, and further compressing the cut boards in a finishing press.

* * * * *